United States Patent
Agnello

(10) Patent No.: US 7,678,400 B2
(45) Date of Patent: Mar. 16, 2010

(54) METHOD OF COOKING CONE-SHAPED FOOD ITEMS

(75) Inventor: Frank Anthony Agnello, South Elgin, IL (US)

(73) Assignee: Prince Castle, Inc., Carol Stream, IL (US)

( * ) Notice: Subject to any disclaimer, the term of this patent is extended or adjusted under 35 U.S.C. 154(b) by 692 days.

(21) Appl. No.: 11/652,776

(22) Filed: Jan. 12, 2007

(65) Prior Publication Data

US 2008/0171122 A1    Jul. 17, 2008

(51) Int. Cl.
*A21D 15/04*    (2006.01)

(52) U.S. Cl. .................. 426/505; 426/523; 426/138; 426/466; 99/386; 99/395; 99/443 C

(58) Field of Classification Search .......... 426/138–139, 426/233, 466, 505, 520, 523; 99/385–386, 99/393, 395, 427, 443 C, 419–421 R, 421 P, 99/421 V
See application file for complete search history.

(56) References Cited

U.S. PATENT DOCUMENTS

| | | | | |
|---|---|---|---|---|
| 1,342,045 A | * | 6/1920 | Hamwi | 99/383 |
| 1,344,285 A | * | 6/1920 | Wolff | 99/373 |
| 1,529,882 A | * | 3/1925 | Galbraith | 99/373 |
| 2,473,402 A | * | 6/1949 | Wood | 99/383 |
| 2,537,378 A | * | 1/1951 | Staltare | 99/393 |
| 2,745,363 A | * | 5/1956 | Balton | 425/334 |
| 3,009,410 A | * | 11/1961 | Murphy | 99/421 V |
| 4,300,443 A | * | 11/1981 | Morcos et al. | 99/332 |
| 4,313,964 A | * | 2/1982 | Dembecki | 426/138 |
| 4,817,513 A | * | 4/1989 | Carbon et al. | 99/383 |
| 7,381,927 B1 | * | 6/2008 | Agnello | 219/388 |
| 7,390,991 B1 | * | 6/2008 | Agnello | 219/388 |
| 2006/0292276 A1 | * | 12/2006 | Huxel et al. | 426/505 |

* cited by examiner

*Primary Examiner*—Drew E Becker
(74) *Attorney, Agent, or Firm*—Kelly & Krause, LP; Joseph P. Krause

(57) ABSTRACT

Cone-shaped food items and cones having various food stuffs in them are cooked by placing a cone-shaped food item into a cone-shaped heating station that travels through an oven and past an inclined heater element. The heating station rotates the cone-shaped food item so that it is uniformly heated as it passes through the oven.

8 Claims, 11 Drawing Sheets

METHOD OF COOKING CONE-SHAPED FOOD ITEMS

Restaurants and food service providers that provide unusual or unique foodstuffs often have a competitive advantage over business that do not otherwise distinguish themselves. Because most restaurants and food service providers cook or heat foodstuffs for consumption before they are sold or served to a customer, the ability to quickly and properly heat or cook a unique food item can be important to the success of a food service business.

As used herein, the term "pizza cone" refers to an edible cone, the interior of which is filled with pizza fillings, such as meats, cheeses and other ingredients. The cone part of a pizza cone is usually made from pizza dough, however, cones made from other types of dough can also be filled with pizza fillings or other foods.

Because of its shape, a pizza cone is particularly difficult to heat and/or cook. If a cone is place on its "side" for cooking, fillings inside the cone will spill or fall out of the cone as temperature rises. If a cone is inverted so that the open end is downward and placed on a flat surface for heating, the contents will also spill when the cone is removed from a heating surface to be turned upright. The best way to heat a filled cone is to heat the cone while it is upright, i.e., with the pointed, narrow end of the cone downward, in order to keep fillings in the cone as it is heated.

A problem with heating and/or cooking edible cones is that their conical shape makes it difficult to evenly heat a cone from top to bottom. A cone is also difficult to heat around its perimeter. A method for cooking cone-shaped food items that would evenly heat a cone from top to bottom and which would even heat a cone-shaped food item all the way around its perimeter would be an improvement over the prior art.

DETAILED DESCRIPTION

Figure 1:
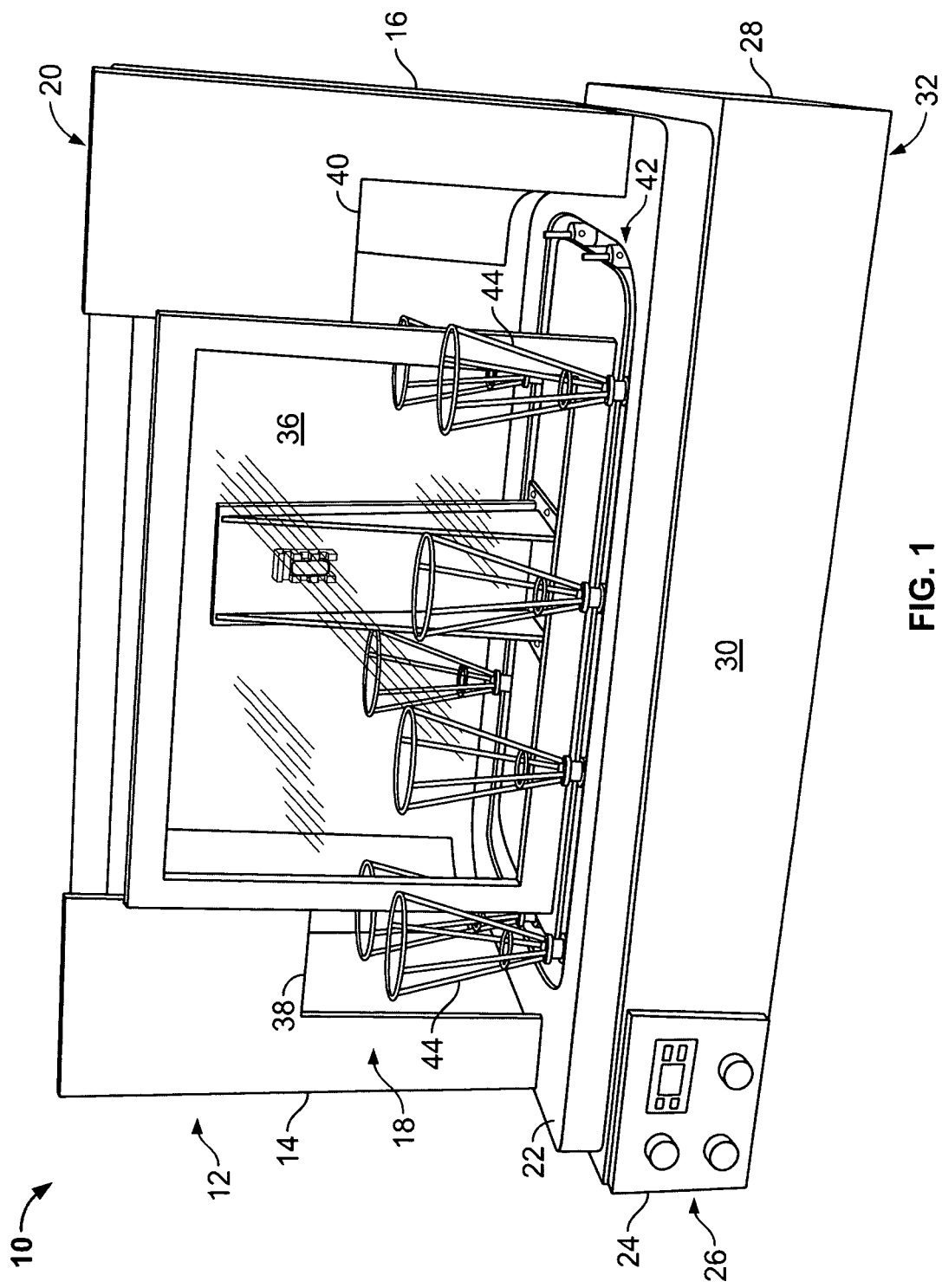
FIG. 1 shows a front elevation view of an oven for baking cones and cone-shaped foods.

FIG. 1 shows a rectangular-shaped oven 10 particularly suited for baking cone-shaped dough and/or batter in order to cook cone-shaped foodstuffs such as pizza cones and ice cream cones. As set fort more fully below, the oven 10 can be readily adapted to cook other shaped food stuffs.

As best seen in FIG. 1, the oven 10 has an upper housing or box 12 having four sides, (left 14, right 16, front 18, and rear, not shown) and a top 20. The sides and top are insulated to keep heat within the oven's interior and to keep the exterior surfaces of the sides and top cool to the touch.

The upper housing 12 is attached to the top surface 22 of a base unit 24. In one embodiment, the upper housing 12 is attached to the base unit 24 by a hinge that is attached to the base unit 24 along the top rear edge (not shown) of the base unit 24 and the lower rear edge of the upper housing 12. The hinge between the upper housing 12 and the base unit 24 allows the upper housing 12 to be pivoted upwardly in order to provide access to the interior of the oven 10.

The base unit 24 has a left side 26, a right side 28, a rear side (not shown), a front side 30, a top 22, and a bottom 32. As can be seen in FIG. 1, the width of the upper housing 12 and the width of the base unit 24 are substantially equal such that the left and right sides of the upper housing 12 and the base unit 24 are substantially co-planar.

In the embodiment of the oven 10 shown in FIG. 1, the front side 18 of the upper housing 12 is provided with a viewing window 36 by which an operator can view the cooking progress of cones or other food stuffs passing through the oven 10. The viewing window 36 is preferably made from a translucent, heat-tolerant glass or other translucent heat-tolerant material, such as quartz.

Importantly, the front side 18 of the upper housing 12 is provided with two passage ways or openings 38 and 40. The openings 38 and 40 are spaced apart from each other in the front side 18 so as to be located proximate to the left-hand side 14 and the right hand side 16 respectively.

Figure 2:
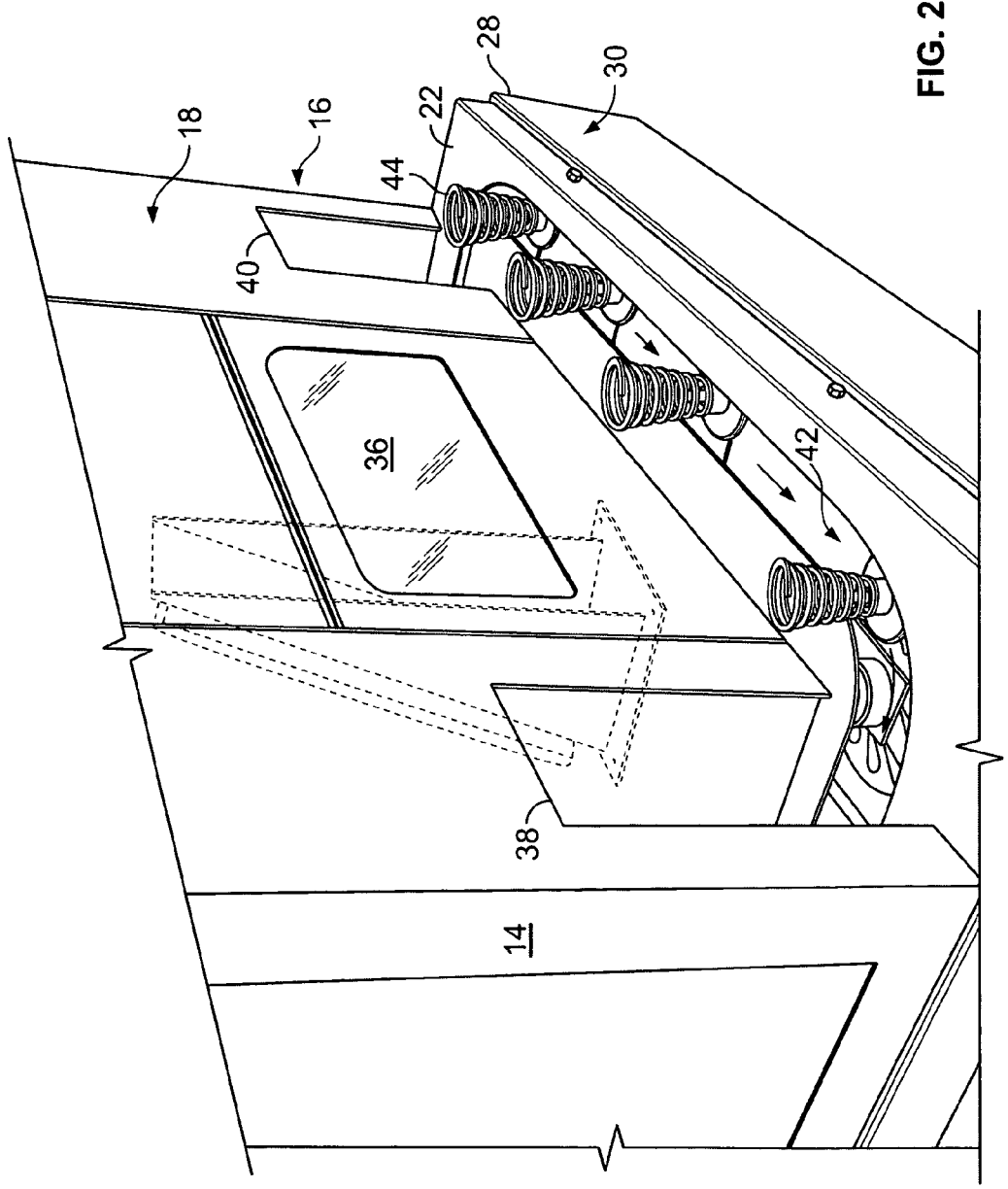
FIG. 2 shows a perspective view of the front side of an oven showing a view of a horizontal carousel conveyor that carries cone-shaped heating stations used to carry cone-shaped foods through the oven.
Figure 4:
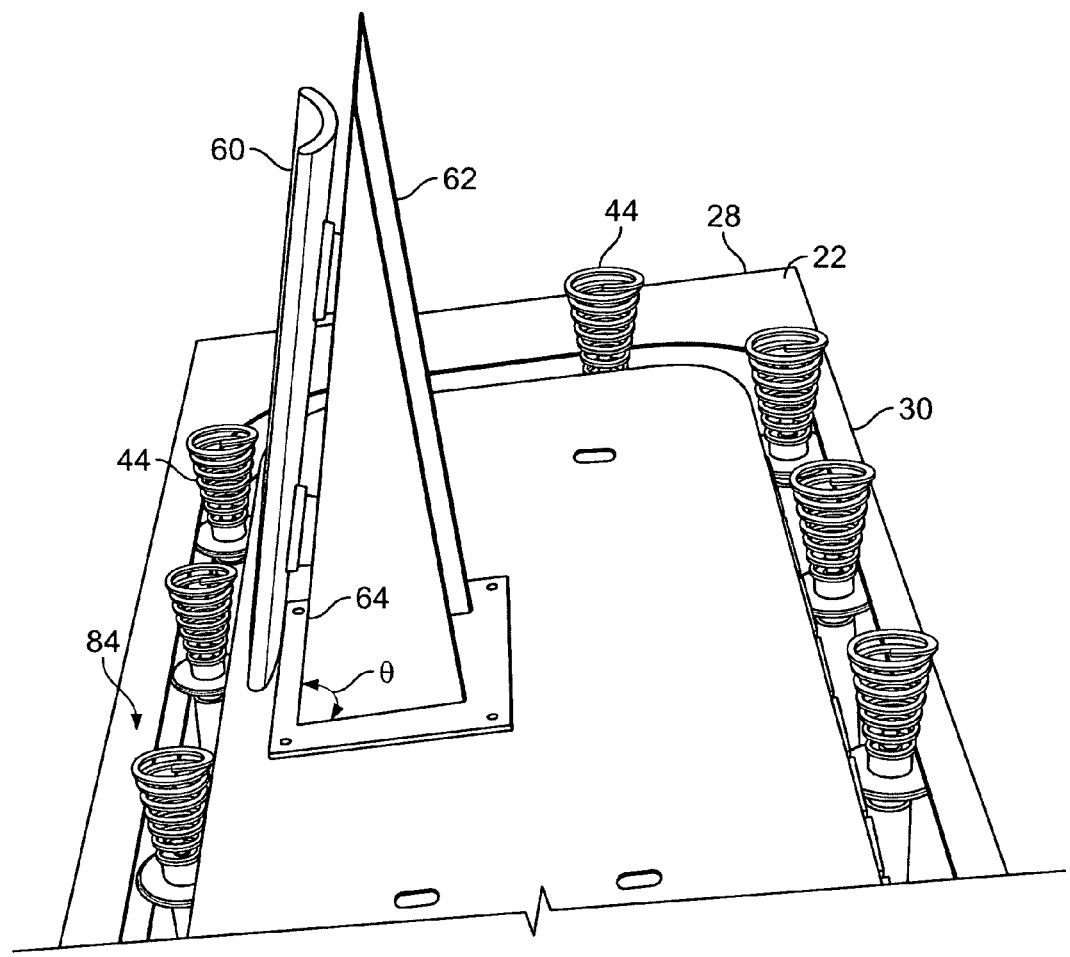
FIG. 4 shows a perspective view of the oven shown in FIG. 1 and FIG. 2 with the oven's upper housing removed to show the routing of the carousel conveyor and an inclined heating element used to heat cones.
Figure 5:
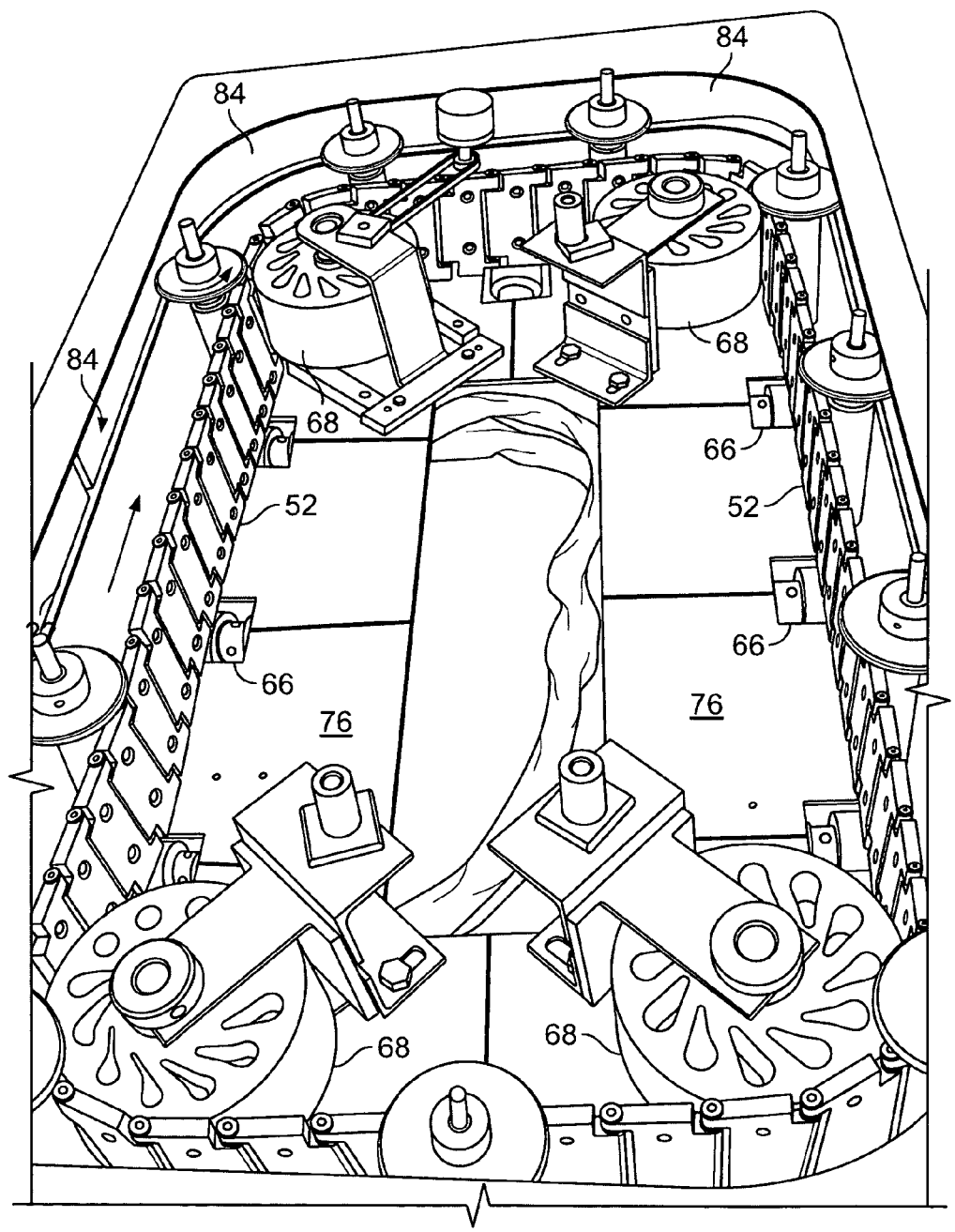
FIG. 5 shows a perspective view of the oven's base unit as viewed from the left side of the oven with the top of the oven's base unit removed to show details of the horizontal carousel conveyor.

A motor-driven, variable speed conveyor mechanism enclosed in the base unit 24 provides a closed-loop, horizontal carousel conveyor 42 (hereafter conveyor 42) by which heating stations 44 attached to the conveyor are carried through the oven 10 in order to cook foodstuffs in or on a heating station. As shown, the heating stations 44 are vertically-oriented and sized, shaped and arranged to hold cone-shaped items upright, i.e., with the narrow, pointed end downwardly. The heating stations are thus referred to as being cone-shaped themselves. The heating stations 44 pass into the oven 10 through a first one of the openings (38 or 40) and out from the oven through the other opening (34 or 32). As can be seen in FIGS. 1, 2 and 4, the several heating stations 44 attached to the conveyor 42 travel in the same, substantially-horizontal geometric plane enabling the cone-shaped heating stations 44 and cones carried on them to pass one or more vertically-oriented heating elements in the oven 10.

Figure 3A:
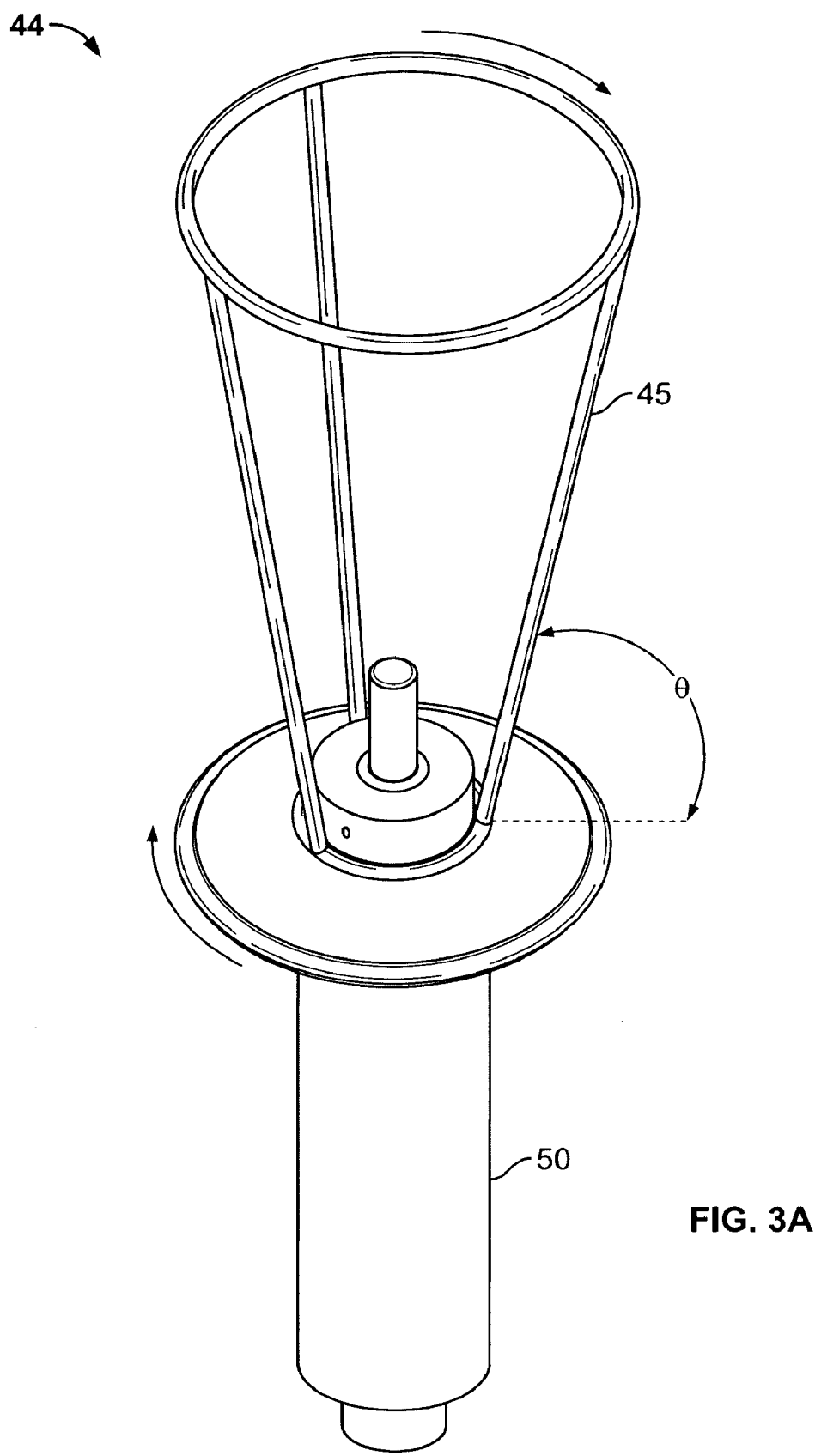
FIG. 3A shows one embodiment of a heating station for use in cooking or heating cone-shaped foods.
Figure 3B:
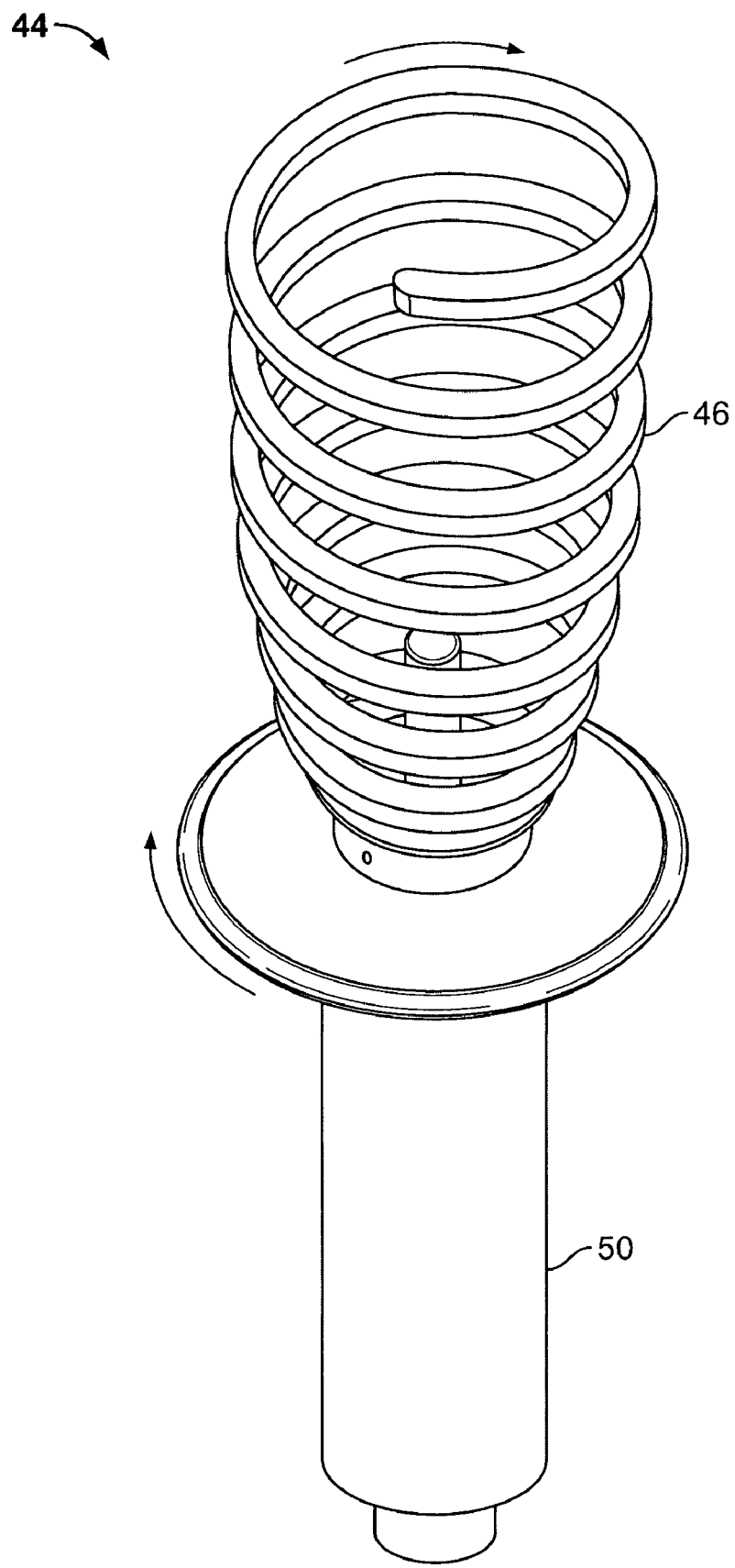
FIG. 3B shows a second embodiment of a heating station for use in cooking or heating cone-shaped foods.

Referring to FIGS. 3A and 3B, the heating stations 44 in one embodiment are cone-shaped wire baskets 45 having a geometric center axis of symmetry (not shown). When the basket 45 is attached to a mandrel 50 that is attached to a link of the conveyor 42, the center axis of symmetry extends upward, orthogonal to the upper surface 22 of the base unit 24. In a second embodiment, the heating stations 44 are cone-shaped wire springs 46, which have a geometric central axis (not shown) about which the coils of the springs are wound. By placing a cone-shaped food item within a cone-shaped basket or a cone-shaped coil, heat is able to reach the cone to cook it as the basket or coil preserves the integrity of the cone.

Figure 6:
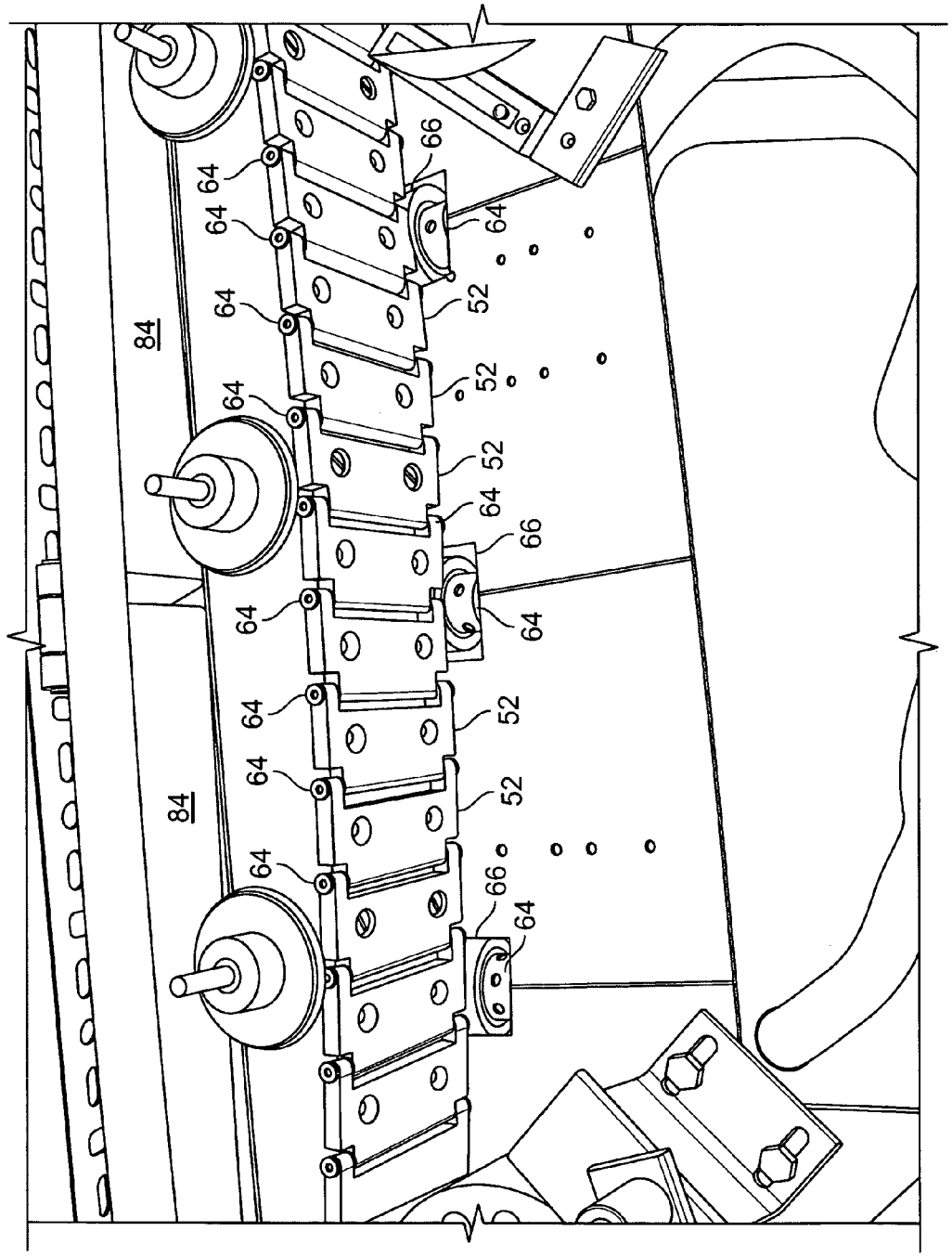
FIG. 6 shows a perspective view of the oven's base unit as viewed from the front of the oven with the top of the base unit removed to show additional details of the carousel conveyor.
Figure 7:
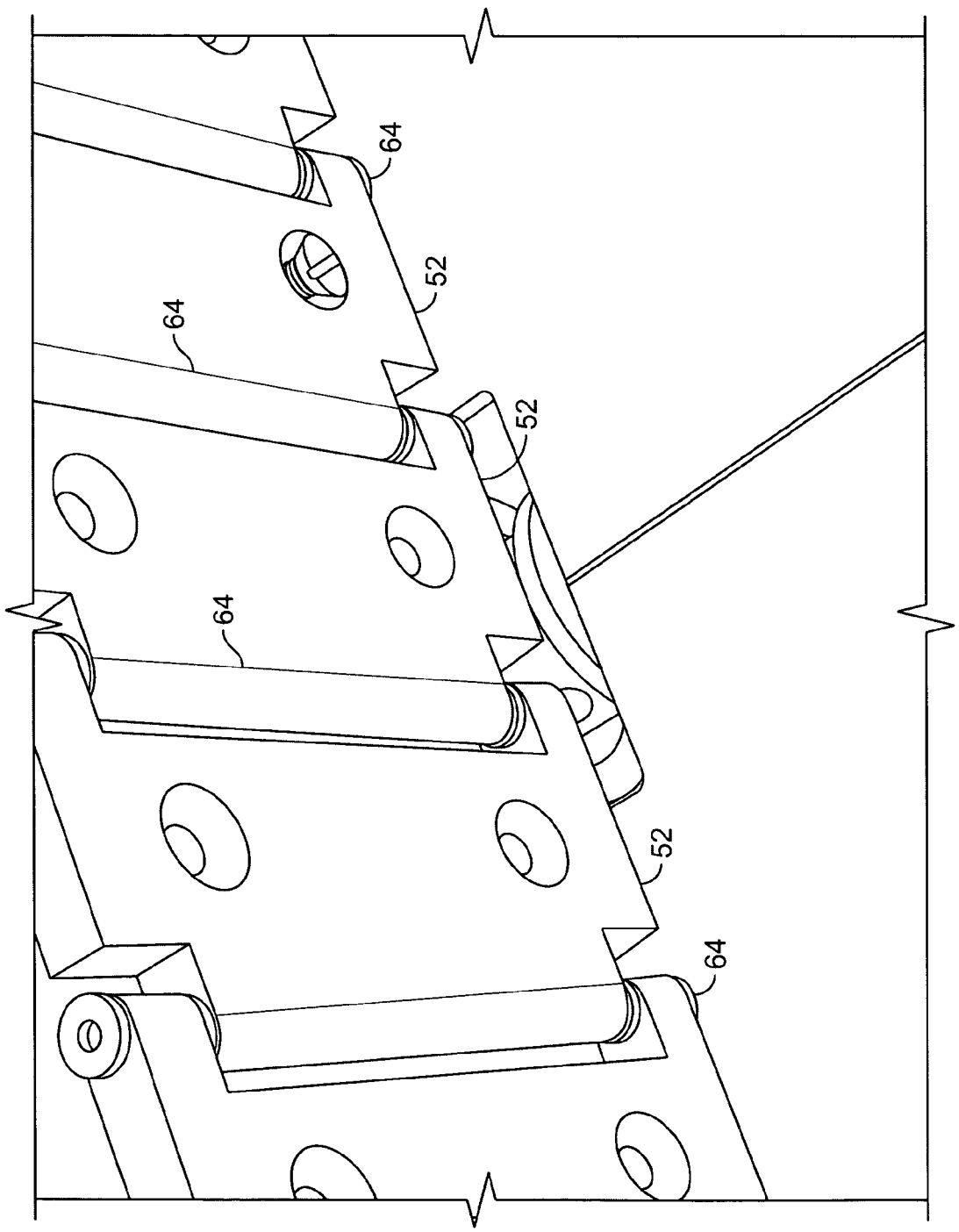
FIG. 7 shows the attachment of the links to each other and how the links of the carousel conveyor ride in and are guided by roller bearings.
Figure 8:
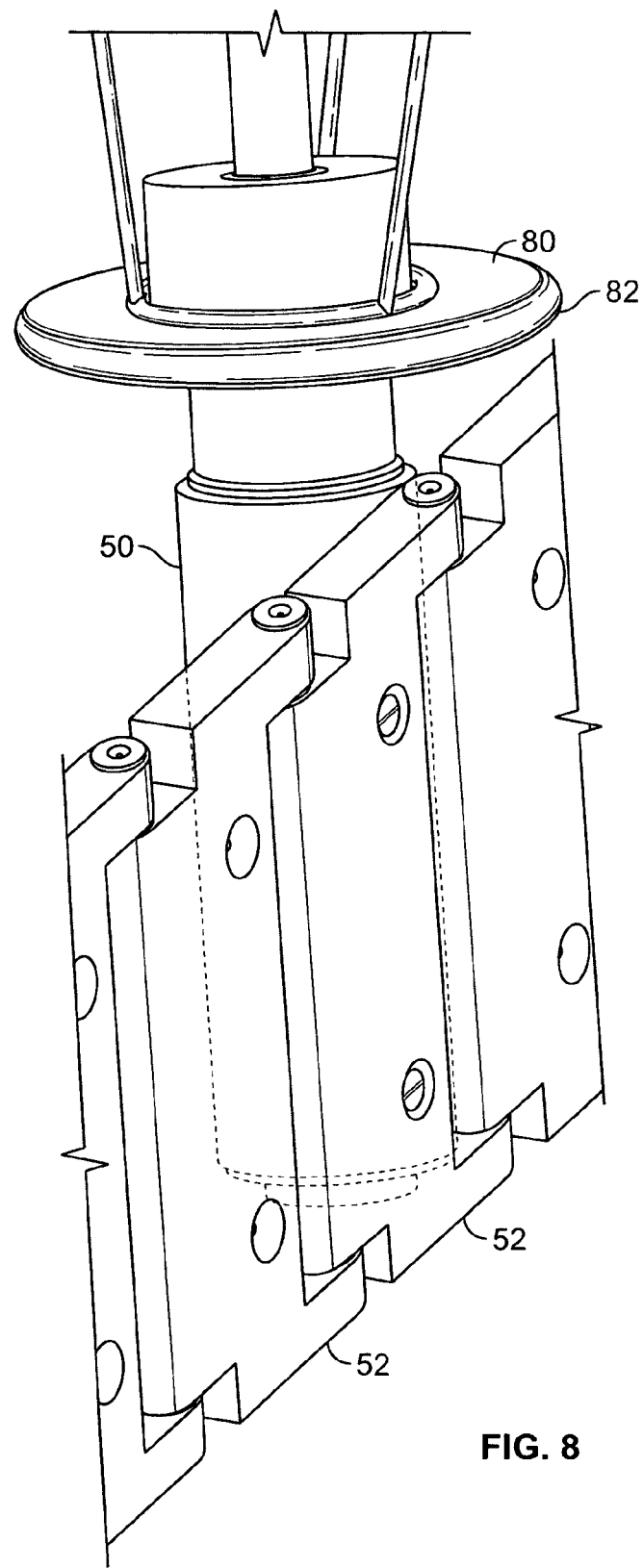
FIG. 8 shows the mounting of a heating station to a link of the carousel conveyor.
Figure 9:
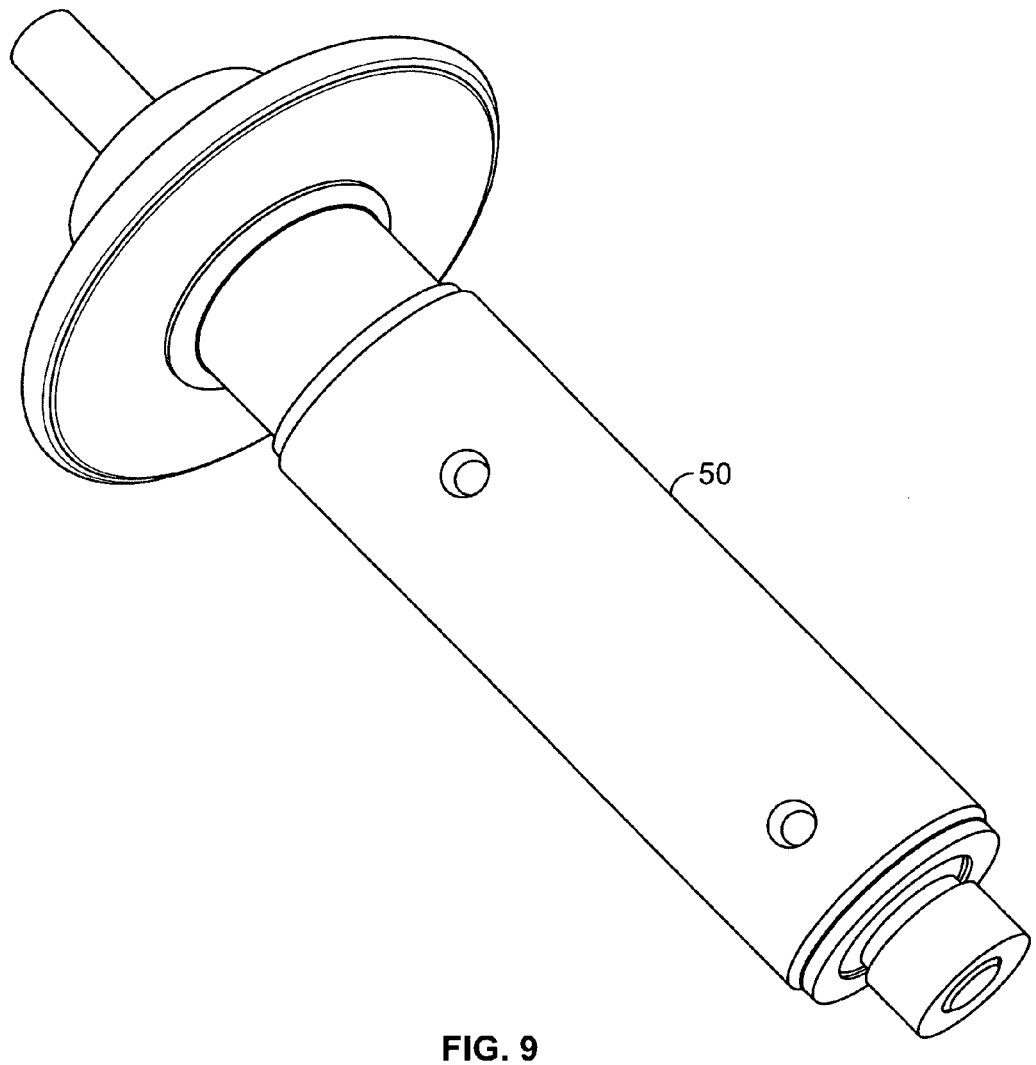
FIG. 9 depicts the mounting holes in the heating station base, by which the heating station is attached to a conveyor link.
Figure 10:
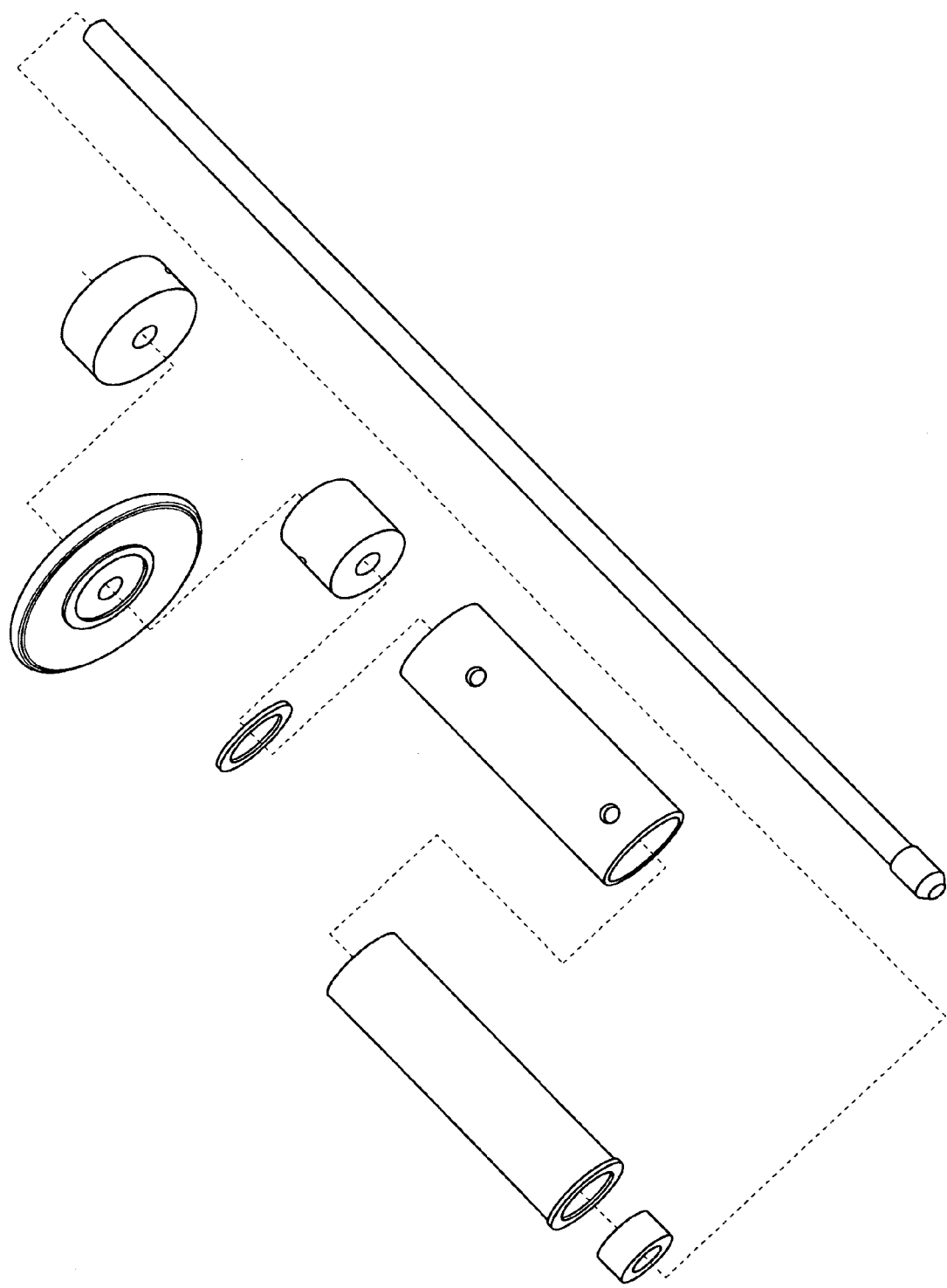
FIG. 10 is an exploded view of the heating station.

As can be seen in FIGS. 3A and 3B, the heating stations are attached to a heating station carrier mandrel 50. As can be seen in FIGS. 6, 7 and 8, the mandrel 50 is then attached to an individual link 52 of the conveyor 42 so that as the conveyor 42 wends its way around the base unit 24, the heating station 44 also moves around the base unit 24. As best seen in FIGS. 9 and 10, two holes 52 and 54 in the heating station mandrel 50 allow the heating station 44 to be attached to conveyor links by machine screws, rivets or sheet metal screws thereby enabling their removal for service. In an alternate embodiment, however, the heating station mandrel 50 could be welded to a link.

FIG. 4 shows a perspective view of the interior of the oven 10, i.e., with the upper housing 12 detached and removed from the base unit 24 to reveal details of the conveyor's routing through the oven 10. As can be seen in FIG. 4, a heater element 60 is mounted to a triangularly-shaped sheet metal heater support bracket 62 such that the heater element 60 is canted or inclined at an angle. Although a single inclined heater element 60 is shown, alternate embodiments of the oven 10 include the use of multiple inclined heater elements. In one alternate embodiment, one or more heater elements are provided both inside and outside the conveyor loop. In yet another embodiment, no heater element is within the loop and one or more heater elements are provided outside the conveyor loop.

The heater element 60 can be implemented using a gas burner, electrically heated quartz, a resistive heating element, or a combination of any two or more of them. The heater support bracket 62 is attached to the top surface 22 of the base unit 24 so that the hypotenuse side 64 of the bracket 62 is closest to the conveyor 42. In the embodiment shown in FIG. 4, the heating stations 44 pass between the heating element 60 and the rear or back side of the oven's upper housing 12. Heat from the heater element 60 is therefore directed rearward, i.e., toward the rear side or back of the oven's upper housing 12 and away from the viewing window 36 in the front side. The rear-ward direction of the heating element 60 away from the window 36 tends to reduce the transmission of infrared heat from the oven.

The hypotenuse side 64 of the heater support bracket 62 is shown in the figure to be inclined at an angle θ with respect to the top surface 22 of the base unit 24. The angle θ corresponds to the angle formed by the "sides" of the cooking stations 42 with respect to the upper surface 30 of the base unit 24. By inclining the heater element 60 to the inclination angle of the cooking stations 42 or the inclination of a shaped food stuff, heat from the heater element 60 is directed horizontally toward foodstuffs on the heating stations 44 that pass in front of the heating element 60. In most cone applications, the angle θ is between about 10 and 30 degrees.

An advantage to inclining the heating element 60 is that foodstuffs carried on the heating stations that are also "angled," are heated more uniformly. Put another way, if the heater element 60 was not inclined and if the axis of a cone passing in front of the heating element 60 was also not inclined, evenly heating a cone-shaped foodstuff would be problematic. If the heating element 60 were vertical and if the cone's axis was also vertical, the wide part of a cone would be too close to the heating element 60, or the narrow pointed end would be too far from the heating element to evenly heat a cone from top to bottom. Portions of a cone farther away from the heating element 60 would either be undercooked while portions of a cone close to the heating element 60 would be overcooked or over heated. By inclining or tilting the heating element 60 as shown, horizontally-directed heat from the heating element 60 enables a cone shaped foodstuff or a cone filled with foodstuffs to be heated more uniformly from top to bottom.

Cone-shaped food items are cooked in the oven 10 by first being placed into one of the cone-shaped heating stations 44. The cone-shaped food item is preferably placed in the heating station 44 when the heating station 44 is outside the heated interior volume of the oven 10.

Once the food item is in the heating station 44, it is carried by the movement of the conveyor 42 into the oven 10. As the conveyor 42 continues to move, it eventually carries the heating station 44 and the food item it carries, past at least one canted heating element 60 located within the oven 10. Heat energy from the heating element 60 is directed substantially horizontal toward the cone-shaped food item due to the fact that the heating element 60 is canted or inclined at an angle that is equal or substantially equal to the angle formed by the cone relative to a vertical line, orthogonal to the top 22 of the base unit 24. The angle formed between the cone's surface and the top 22 is the same or substantially the same as the angle θ that the inclined heating element 60 makes with respect to the top 22. Thus, the distance between the heater element 60 and the cone's surface, from its top to its bottom, is uniform providing for a uniform radiation and/or heating of the cone by the heating element 60.

In a preferred embodiment, the conveyor 42 is sized, shaped and arranged to cause the heating station 44 to rotate as it passes by the canted heating element 60. By rotating the heating station 44, the cone shaped food item will also rotate and thereby enable heat to be directed uniformly all the way around the cone and evenly distributed from top to bottom as the heating station 44 rotates as it passes by the canted heating element.

In the oven 10 shown in the figures, the heating station rotation stops when the heating station 44 exits the oven 10 in order to facilitate removal of the cone. As can be seen in the figures, the canted heating element 60 is curved so as to be concave relative to a center axis of the heating element. The center axis of the heating element is inclined at an angle that is substantially equal to the equal to the angle between a horizontal plane and the cone portion of the cone-shaped food item.

The foregoing method of cooking cone-shaped food items is provided as an example. The true scope of the invention is set forth in the appurtenant claims.

What is claimed is:

1. A method of cooking cone-shaped food items in an oven comprising the steps of:
    a. placing a cone-shaped food item into a cone-shaped heating station;
    b. moving the cone-shaped food item into an oven on a carousel so that the cone-shaped food item passes in front of at least one, canted heating element, the heat energy of which is directed substantially horizontal toward the cone-shaped food item;
    c. causing the heating station to rotate as it passes by the canted heating element, said cone shaped food item also rotating with the heating station as the heating station rotates as it passes by the canted heating element.

2. The method of claim 1, wherein the step of causing the heating station to rotate includes, causing the heating station to rotate by the heating station's movement by the conveyor such that movement of the conveyor causes rotation of the heating station.

3. The method of claim 1 wherein the canted heating element is inclined at an angle substantially equal to the angle between a horizontal plane and the cone portion of the cone-shaped food item so that the spacing between the cone portion of the food item and the heating element is uniform from the top of the cone to the bottom of the cone.

4. The method of claim 1, further comprising the step of stopping the rotation of the heating station after it has passed the canted heating element.

5. The method of claim 1, wherein the canted heating element is a substantially planar heating element.

6. The method of claim 1, wherein the heating element is gas-fired.

7. The method of claim 1, wherein the heating element is electrically powered.

8. The method of claim 1, wherein the canted heating element is curved to be concave relative to a center axis, said axis being inclined at an angle that is substantially equal to the equal to the angle between a horizontal plane and the cone portion of the cone-shaped food item.

* * * * *